United States Patent
Fan et al.

(10) Patent No.: US 10,912,631 B2
(45) Date of Patent: Feb. 9, 2021

(54) SNAP-COUPLING TEMPORARY ABUTMENT MOUNT FOR DENTAL PROSTHESIS

(71) Applicant: EVOLLUTION IP HOLDINGS, INC., Birmingham, AL (US)

(72) Inventors: Haibo Fan, Woodbridge, CT (US); Boris Simmonds, Vestavia, AL (US); Fred J. Molz, IV, Birmingham, AL (US)

(73) Assignee: EVOLLUTION IP HOLDINGS, INC., Birmingham, AL (US)

( * ) Notice: Subject to any disclaimer, the term of this patent is extended or adjusted under 35 U.S.C. 154(b) by 90 days.

(21) Appl. No.: 15/921,208

(22) Filed: Mar. 14, 2018

(65) Prior Publication Data

US 2018/0200030 A1    Jul. 19, 2018

Related U.S. Application Data (63) Continuation-in-part of application No. 15/363,183, filed on Nov. 29, 2016, now Pat. No. 10,433,936.

(60) Provisional application No. 62/261,613, filed on Dec. 1, 2015.

(51) Int. Cl.
*A61C 8/00* (2006.01)

(52) U.S. Cl.
CPC .......... *A61C 8/0062* (2013.01); *A61C 8/0001* (2013.01); *A61C 8/006* (2013.01); *A61C 8/0022* (2013.01); *A61C 8/0054* (2013.01); *A61C 2008/0084* (2013.01); *A61C 2201/005* (2013.01)

(58) Field of Classification Search
CPC ..... A61C 8/0001; A61C 8/006; A61C 8/0074; A61C 8/0012; A61C 9/0053
See application file for complete search history.

(56) References Cited

U.S. PATENT DOCUMENTS

| 5,674,073 A | 10/1997 | Ingber et al. |
| 5,904,483 A * | 5/1999 | Wade .................. A61C 8/0048 |
| | | 433/173 |
| 6,283,753 B1 | 9/2001 | Willoughby |
| (Continued) | | |

FOREIGN PATENT DOCUMENTS

| EP | 2462893 B1 | 3/2014 |
| WO | 2016012581 A1 | 1/2016 |

OTHER PUBLICATIONS

Invitation to Pay Additional Fees for PCT/US2019/022007; dated Jun. 6, 2019; 12 pgs.

(Continued)

*Primary Examiner* — Ralph A Lewis
(74) *Attorney, Agent, or Firm* — Gardner Groff & Greenwald, PC (57) ABSTRACT

A temporary cylinder for snap-in retention with an elongate dental implant includes an elongate body extending from a first end to a second end, the elongate body being generally cylindrical and having an upper portion and a lower engagement portion and the temporary cylinder's lower engagement portion includes a male irregular hexagonal plug, and wherein the dental implant includes a female regular hexagonal socket, and wherein the male irregular hexagonal plug and the female regular hexagonal socket are configured for inter-engagement with each other, and the fitment of the irregular hexagonal plug and regular hexagonal socket together with one another results in a frictional fit when inter-engaged.

21 Claims, 4 Drawing Sheets

(56) References Cited

U.S. PATENT DOCUMENTS

| | | | |
|---|---|---|---|
| 7,066,736 B2 | 6/2006 | Kumar et al. | |
| 7,163,398 B2 * | 1/2007 | Klardie | A61C 8/0001 |
| | | | 433/173 |
| 8,075,313 B2 | 12/2011 | Ranck et al. | |
| 8,747,112 B2 | 6/2014 | Brun | |
| 8,801,435 B2 * | 8/2014 | Jahn | A61C 9/0053 |
| | | | 433/173 |
| 8,882,508 B2 | 11/2014 | Bellanca et al. | |
| 9,357,927 B2 | 6/2016 | Thomsen | |
| 10,159,545 B2 | 12/2018 | Thome et al. | |
| 10,433,936 B2 | 10/2019 | Fan et al. | |
| 2007/0281278 A1 * | 12/2007 | Jorneus | A61C 8/0001 |
| | | | 433/173 |
| 2008/0176188 A1 | 7/2008 | Holzner et al. | |
| 2008/0206709 A1 | 8/2008 | Lannan | |
| 2012/0052463 A1 | 3/2012 | Pollet | |
| 2014/0124374 A1 | 5/2014 | Eriksson et al. | |
| 2017/0151038 A1 | 6/2017 | Fan et al. | |

OTHER PUBLICATIONS

Camlog Titanium Bases CAD/CAM; 4 pgs; date unknown.
International Search Report & Written Opinion for PCT/US2019/019990; dated May 14, 2019; 11 pgs.

* cited by examiner

FIG. 6 fig.7 fig.8

# SNAP-COUPLING TEMPORARY ABUTMENT MOUNT FOR DENTAL PROSTHESIS

CROSS-REFERENCE TO RELATED APPLICATIONS

This application is a continuation-in-part of U.S. Non-Provisional patent application Ser. No. 15/363,183 filed Nov. 29, 2016, which claims the benefit of U.S. Provisional Patent Application Ser. No. 62/261,613 filed Dec. 1, 2015, the entireties of which are hereby incorporated by reference herein.

TECHNICAL FIELD

The present invention relates generally to the field of dental implants and prosthetics, and more particularly to a temporary mount or cylinder having snap-in retention capability for use with a dental implant or implant analog.

BACKGROUND

Dental implants are used to provide a platform to which a dental prosthesis may be secured to underlying bone in the mandible or maxilla of a dental patient. A typical root form dental implant system employs a dental implant that is placed in a prepared site in the underlying bone. Once the implant is engaged in the site, a cover screw is affixed to the top of the implant and the bone surrounding the prepared site is allowed to grow into the implant for several months, thereby securing the implant to the bone.

Once the surrounding bone has sufficiently engaged the implant, an impression of the implant and the surrounding teeth is taken and a dental prosthesis is constructed using the impression as a model of the area of the patient's mouth surrounding the implant site. The dental prosthesis is then affixed to the abutment with cement, or other affixing means. Thus, the abutment acts as a platform for securing a dental prosthesis to the implant.

Modeling, construction and fitment of the final dental prosthesis can take considerable time, during which time it is often desirable to fit a temporary or provisional prosthesis. Such a temporary or provisional prosthesis is typically mounted to a temporary mount (sometimes referred to as a temporary cylinder). The temporary cylinder is typically fastened to the implant by a screw that is threaded through the temporary cylinder and into the implant. During the oftentimes iterative process of fitting the temporary prosthesis to the patient, the temporary cylinder may be installed and removed multiple times, which can be both tedious and time-consuming. Moreover, in the posterior of the mouth, access for threading the screw through the temporary cylinder and into the implant can be limited.

In most cases, the provisional prosthesis is generally fastened to the implant with an abutment screw, which generally requires a clinician to manually screw the abutment screw to the implant. One drawback to manually screwing an abutment screw within the implant to fasten the provisional prosthesis to the implant is that some installation drivers can be long, requiring a significant amount of vertical space, thereby making placement of the abutment screw difficult in the posterior of a patient's mouth where vertical space is often limited. Another drawback is due to the time required to manually place and remove the abutment screw to/from the implant before and after placing the provisional prosthesis. And the abutment screw can be dropped in the patient's mouth before placement or after removal, which may present an aspiration risk.

Accordingly, it can be seen that needs exist for an improved temporary cylinder or mount for use with dental implant procedures. It is to the provision of such an improved temporary cylinder that the present invention is primarily directed.

SUMMARY

In example embodiments, the present invention provides a temporary cylinder having snap-in retention capability for engagement with a dental implant or an implant analog. The temporary cylinder is capable of snapping in or frictionally engaging the implant or implant analog such that fasteners or screws are not necessarily required to retain the temporary cylinder temporarily in place on the implant or implant analog.

In one aspect, the present invention relates to a temporary cylinder for snap-in retention with an elongate dental implant includes an elongate body extending from a first end to a second end, the elongate body being generally cylindrical and having an upper portion and a lower engagement portion and the temporary cylinder's lower engagement portion includes a male irregular hexagonal plug. The dental implant includes a female regular hexagonal socket, and the male irregular hexagonal plug and the female regular hexagonal socket are configured for inter-engagement with each other. The fitment of the irregular hexagonal plug and regular hexagonal socket together with one another results in a frictional fit when inter-engaged.

Preferably, the male irregular hexagonal plug includes at least some contact surfaces having a first dimension and some other contact surfaces of a second dimension, the second dimension being different than the first dimension.

Optionally, the male irregular hexagonal body comprises six external contact surfaces, and some of the contact surfaces are substantially flats and some are ribbed. Preferably, at least three of the six external contact surfaces are ribbed. Also preferably, the contact surfaces comprising alternating flat contact surfaces and ribbed contact surfaces are equally distributed around the male irregular hexagonal body.

Optionally, the male irregular hexagonal body comprises six external contact surfaces, and wherein all of the contact surfaces are substantially flats.

Optionally, an engagement rib is provided adjacent the lower engagement portion and insertion depth of the male irregular hexagonal plug into the female regular hexagonal socket is limited by the at least one engagement rib.

Optionally, the temporary cylinder comprises a polymer. In one preferred example form, the polymer comprises polyether ether ketone.

Optionally, the temporary cylinder's upper portion comprises a series of spaced apart ridges each having flats formed on the periphery of the ridges.

Optionally, the temporary cylinder is provided with a central, axial screw hole for securing the temporary cylinder to an implant or implant analog by use of a screw, thereby allowing the temporary cylinder at times to be secured to the implant/implant analog by use of a screw and at other times to be secured to the implant/implant analog by friction fit of the irregular hexagonal plug and regular hexagonal socket together with one another.

In another aspect, the invention relates to a method of fitting a provisional restoration appliance to a patient's jaw. This includes providing a dental implant, the dental implant comprising both female threads and a female hex socket and providing a temporary cylinder for snap-in retention with the dental implant. The temporary cylinder has an engagement portion comprising a male irregular hexagonal plug. The method also includes temporarily engaging the male irregular plug of the temporary cylinder within the female socket of the implant with a detachable friction fit to temporarily secure the provisional restoration appliance to the patient's jaw. The method includes observing the fit of the provisional restoration appliance and removing the provisional restoration appliance and making adjustments as needed, and, once the fit is satisfactory, installing the provisional restoration appliance and securing it to the patient's jaw using screws screwed through the temporary cylinder and into the dental implant.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description are exemplary and explanatory of example embodiments of the invention, and are not restrictive of the invention, as claimed.

DETAILED DESCRIPTION OF EXAMPLE EMBODIMENTS

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
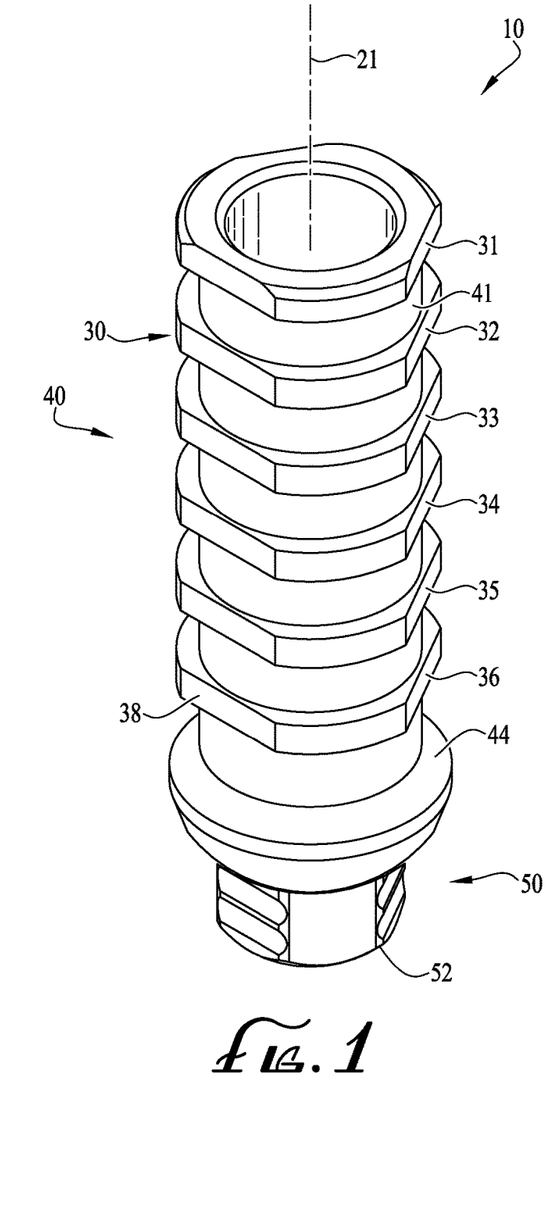
FIG. 1 is a top perspective view of a temporary cylinder for use with a dental implant according to an example embodiment of the present invention.
Figure 2:
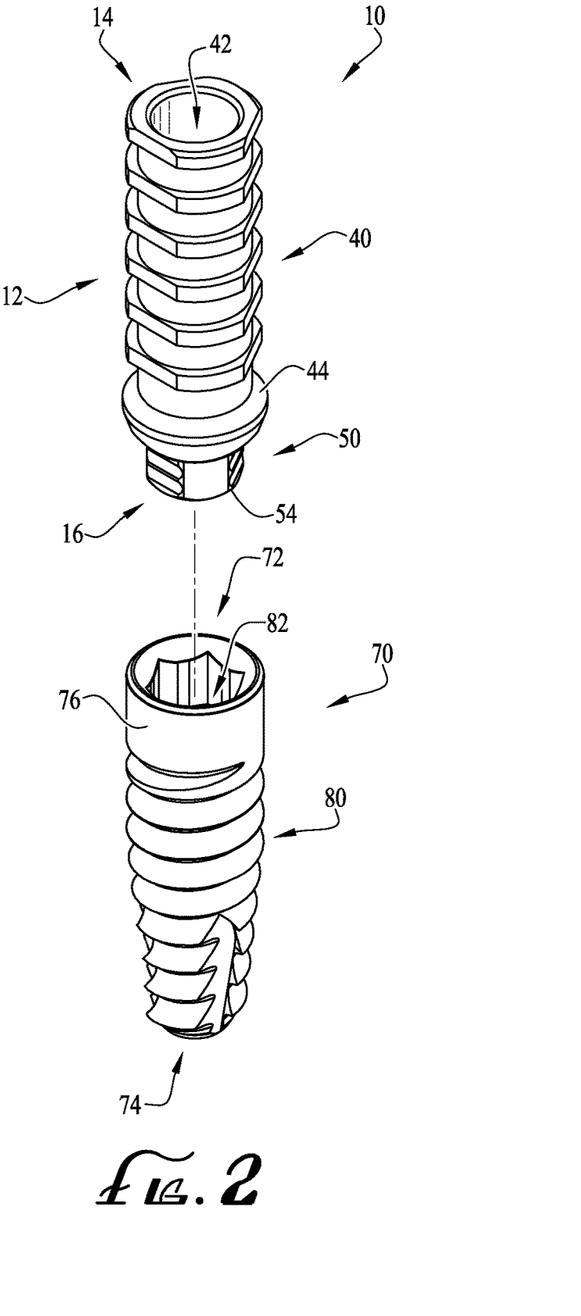
FIG. 2 is top perspective view of the temporary cylinder of FIG. 1 and an implant for use therewith.

With reference now to the drawing figures, wherein like reference numbers represent corresponding parts throughout the several views, FIGS. 1-2 show a temporary cylinder 10 for use with a dental implant 70 (shown in detail in FIG. 6) according to an example embodiment of the present invention. In example embodiments, the temporary cylinder 10 enables a dental clinician to mount a prosthesis to the implant 70 that is engaged with the patient's jaw. Preferably, the temporary cylinder 10 is configured such that no separate fasteners, screws, etc. are required for mounting the temporary cylinder 10 to the implant 70. Optionally, in some situations the temporary cylinder 10 can be temporarily attached to the implant 70 with a fastener threaded down through the middle of the temporary cylinder 10 and into the implant 70.

In example embodiments, the temporary cylinder 10 is used with a dental implant 70. Thus, with the implant 70 secured within the bone structure of the patient's jaw, the temporary cylinder 10 is releasably engaged by a frictional fit or snap coupling with the implant 70. According to other example embodiments, the temporary cylinder 10 can be used with an implant analog (e.g., model of the patient's dentition formed by an impression), for example, wherein the temporary cylinder 10 can be frictionally engaged with the implant analog for fitting of a provisional prosthesis. As such, the temporary cylinder 10 as described herein may be provided for use with an implant or alternatively may be provided for engagement with an implant analog. Accordingly, the temporary cylinder 10 provides for dual functionality whereby the temporary cylinder 10 can be used with implants, or whereby the temporary cylinder 10 can be used with an implant analog. Optionally, the temporary cylinder 10 is provided with a central, axial screw hole 42 for securing the temporary cylinder 10 to an implant 70 or implant analog by use of a screw, thereby allowing the temporary cylinder 10 at times to be secured to the implant/implant analog by use of a screw and at other times to be secured to the implant/implant analog by friction fit of the irregular hexagonal plug and regular hexagonal socket together with one another. In example embodiments, a portion of the axial screw hole 42 can include threads 43 configured to engage a screw or other threaded fastener.

The temporary cylinder 10, according to one example embodiment of the present invention, provides for snap-in retention with a dental implant 70 extending along a first elongate axis 71. The implant 70 comprises a first engagement section 72 for engaging the temporary cylinder 10. The temporary cylinder 10 generally comprises an elongate body 12 extending from a first end 14 to a second end 16 and defining a second elongate axis 21. Preferably, the elongate body 12 includes an upper section or portion 40 positioned adjacent the first end 14 and comprising a generally cylindrical portion 41. The cylindrical portion 41 can comprise at least one ridge 30. In the depicted embodiment, the cylindrical portion includes a series of ridges 31, 32, 33, 34, 35, 36 evenly spaced along the length of the cylindrical portion 41. In example embodiments, the ridges 30 include at least one, and in some cases a plurality, of flats 38 formed on the periphery of the ridge. The ridges 30 provide the clinician guidance on where to cut the temporary cylinder to properly fit the temporary prosthesis. A second engagement section 50 is positioned adjacent the upper section 40. The second engagement section 50 is positioned adjacent the second end 16 of the temporary cylinder 10. The temporary cylinder's second engagement section 50 comprises a male irregular hexagonal plug 52 and the implant's first engagement section 72 comprises a female regular hexagonal socket 82. Preferably, the male irregular hexagonal plug 52 and the female regular hexagonal socket 82 are configured for inter-engagement with each other, and the fitment of the irregular hexagonal plug 52 and regular hexagonal socket 82 with one another results in a frictional fit when inter-engaged.

Figure 3:
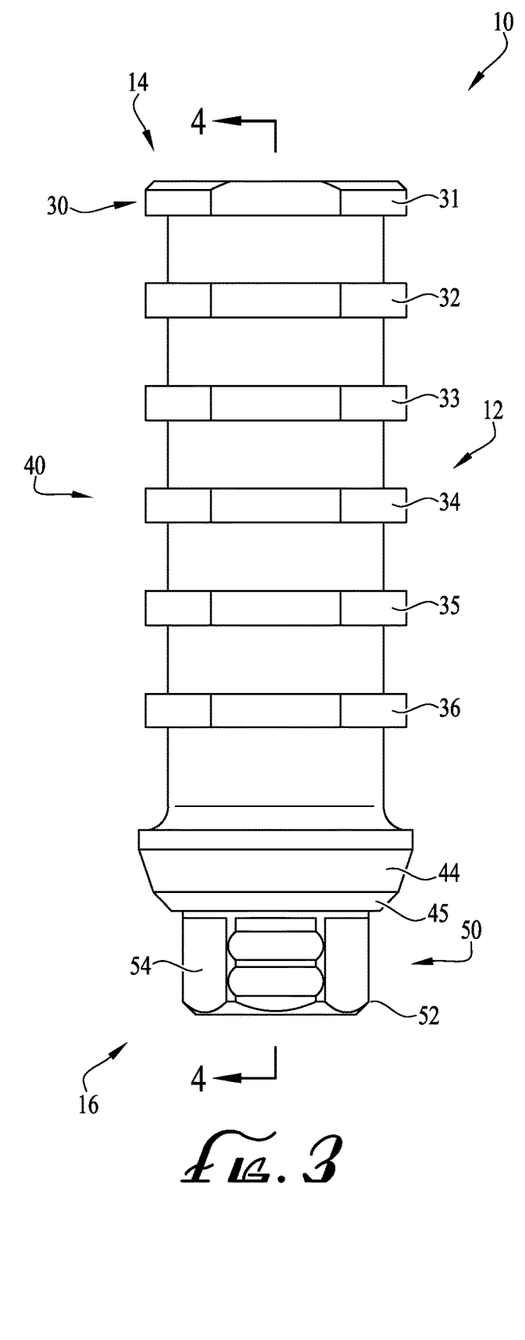
FIG. 3 is a side elevation view of the temporary cylinder of FIG. 1.
Figure 4:
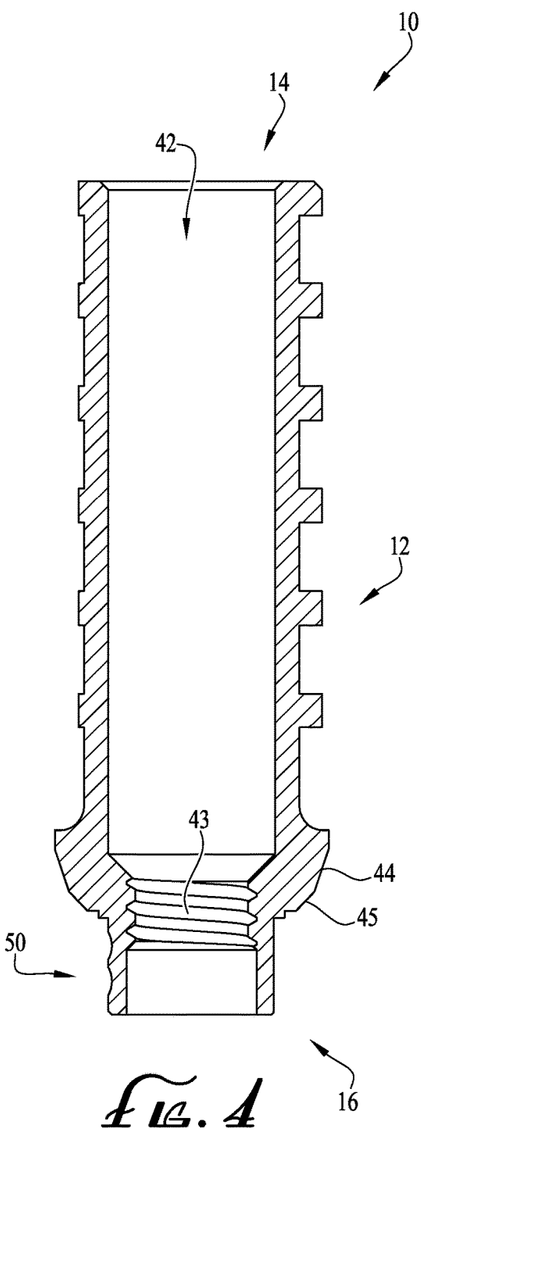
FIG. 4 is sectional view of the temporary cylinder of FIG. 3, showing a sleeve component separated therefrom.

As depicted in FIGS. 3-4, the temporary cylinder 10 generally comprises an elongate body 12. The elongate body 12 generally comprises a first end 14 and a second end 16 generally opposite thereto. In example embodiments, the elongate body 12 generally comprises the upper section 40 and the second engagement section 50. According to one example embodiment, the elongate body 12 is formed from a material suitable for dental applications (e.g., polyether ether ketone plastic (PEEK)), for example, which may be formed by an injection molding and/or milling process. In alternate example embodiments, the elongate body 12 can be formed from a radiopaque plastic (e.g., PEEK with barium sulfate), or can optionally be formed from other plastics or metals. In example embodiments, the elongate body 12 is integrally formed as one unitary piece. Alternatively, one or more portions of the elongate body 12 may be formed separately and connected together.

The upper section 40 is generally positioned adjacent to the first end 14 and comprises a generally uniform cylindrical portion 41, a cylindrical channel 42 extending through the cylindrical portion 41, and a lower rib 44 extending around the entirety of the periphery of the cylindrical portion 41. In alternate embodiments, the cylindrical channel 42 can be otherwise shaped and configured to extend entirely through the cylindrical portion 41, or for example, may extend through at least a portion of the cylindrical channel 42. In example embodiments, the channel 42 is preferably sized such that a dental tool or probe is capable of being inserted at least partially therein, for example, such that the assembly 10 can be removed from disengagement with the implant 70, for example by retraction using a dental probe or other tool engaged in the channel 42. The lower rib 44 is generally positioned at the bottom end of the cylindrical portion 41, adjacent the second engagement section 50. Preferably, the lower rib 44 of the upper section is sized to be at least slightly larger than the implant 70, for example, such that the top of the implant 70 is not permitted to move beyond the lower rib 44. Thereby, the rib 44 acts to limit the insertion depth of the male body 52 into the female socket 82 of the implant 70. For example, according to example embodiments, the lower rib 44 comprises an engagement surface or shoulder 45 that is generally configured for direct engagement with an engagement or contact surface of the implant 70.

The second engagement section 50 is generally positioned adjacent the upper section 40 and is preferably complementary in shape to the first engagement section 82 of the implant 70. The second engagement section 50 may include a male polygonal body 52 (such as a hexagonal protrusion), and similarly, the first engagement section may be a female polygonal (for example hexagonal) socket 82, for example, so that the male polygonal body 52 is capable of cooperative engagement with the female polygonal socket 82. In example embodiments, the configuration of the male portion 52 and female portion 82 may be commonly known as external (plug) and internal (socket) rotational hex drive profiles. In other example embodiments, other configurations of engagement sections (including non-polygonal surfaces) may be employed. For example, according to example embodiments, the second engagement section can be configured and adapted for cooperative engagement with other known implant systems (e.g., Nobel Biocare® NobelReplace™, Straumann®, etc.). The profile and configuration of the first and second engagement surfaces preferably retain the temporary cylinder in the implant and prevent rotation of the temporary cylinder relative to the implant. The profile and configuration of the second engagement section 52 optionally matches or corresponds at least in part to the profile and configuration of a dental implant abutment mount 82 to which a dental prosthesis is mounted for compatibility with the implant.

Figures 5A, 5B, 6:
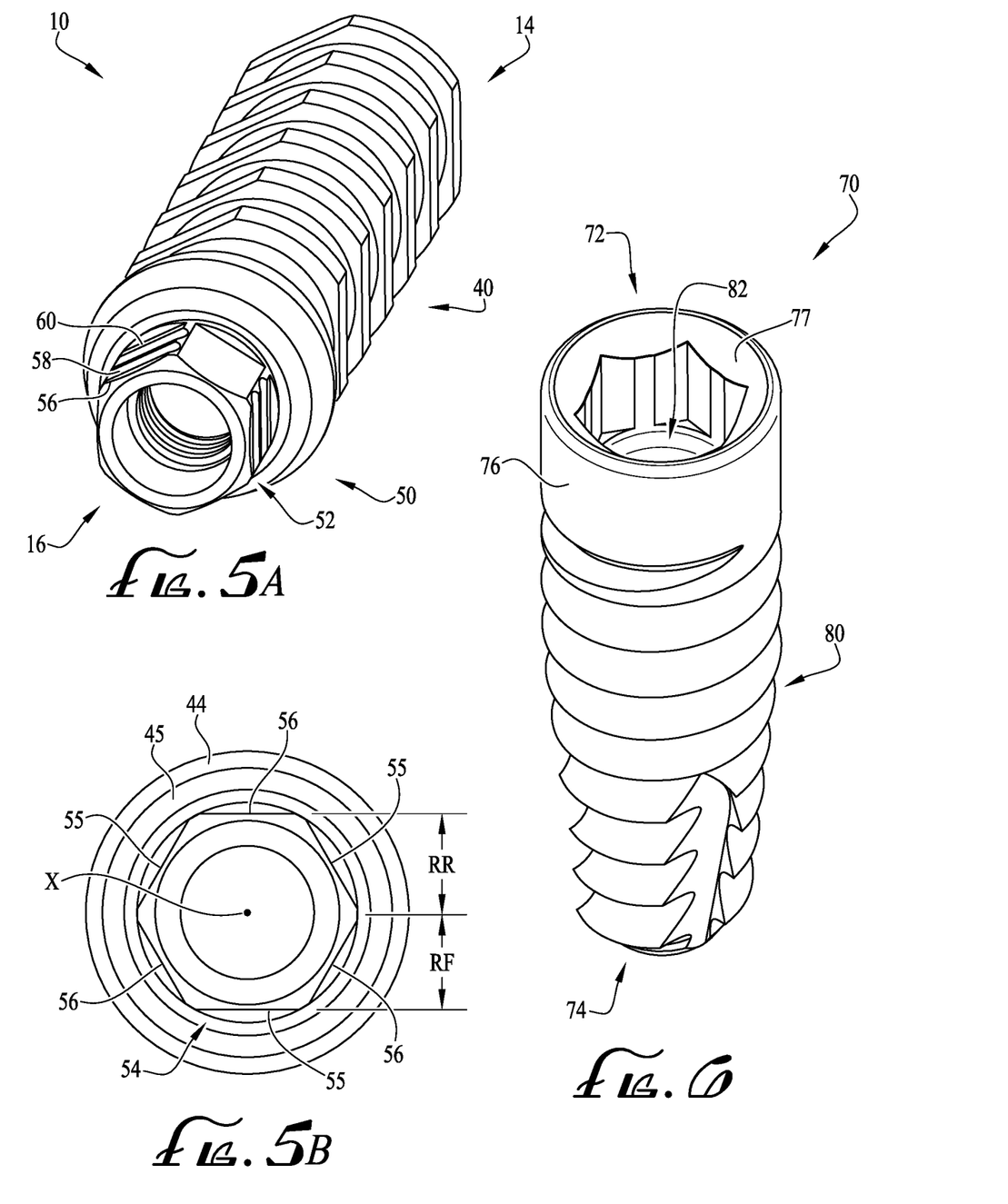
FIG. 5A is bottom perspective view of the temporary cylinder of FIG. 1.
FIG. 5B is an end view of the base portion of the temporary cylinder of FIG. 1.
FIG. 6 is a perspective view of an implant for use with the temporary cylinder of FIGS. 1-5.

As depicted in FIG. 5A, the male body or plug 52 of the second engagement section 50 of the temporary cylinder 10 preferably comprises one or more surface features formed thereon for frictionally or otherwise releasably and positively engaging the first engagement section 82 of the dental implant 70. Generally, the male plug 52 includes a plurality of engagement surfaces 54. In the depicted embodiment, at least one of the surfaces 54 of the male plug 52 comprises one or more snap-in releasable engagement features or engagement ribs 56. In example embodiments, the engagement ribs 56 generally extend horizontally along at least one of the surfaces 54, and a groove 60 or flat generally extends along one or more sides of the engagement ribs 56. In example embodiments, the engagement ribs 56 are dimensioned to be at least slightly larger than a majority of the surface 54 it is formed on for providing a frictional engagement fit with the first engagement section 82. For example, where the first engagement section 82 is a female hexagonal ("hex") configuration and the second engagement section 54 is a male hex configuration, the engagement ribs 56 extend or project outwardly at least partially beyond the dimension of the female hex of the first engagement section 82, for example, so that there is at least a slight amount of interference between the first and second engagement sections to provide for a releasable or detachable friction fit therebetween.

According to example embodiments and as depicted in FIG. 5B, at least three of the six transverse side surfaces 54 of the male hex 52 of the second engagement section 50 comprise one or more engagement ribs 56, which generally extend horizontally or transversely relative to the longitudinal axis X of the elongate body 12. The side surfaces that are not provided with one or more engagement ribs 56 define a smooth and planar surface 55. In example embodiments, every other surface of the male hex comprises one or more of the engagement ribs 56, for example, such that the ribs 56 are generally equally spaced apart around the male hex and whereby engagement with the first engagement section 82 causes the temporary cylinder 10 to become axially and concentrically aligned with the implant 70. Thus, in example embodiments, three of the surfaces 54 comprise one or more engagement ribs 56, and the other three surfaces can define generally smooth and planar surfaces 55 (see FIGS. 5A-B).

According to example embodiments, the surfaces comprising the engagement ribs 56 define a dimension RR between an outer surface of the rib 56 and an axis X extending axially therethrough, and the smooth finished surface 55 has a dimension of RF that is defined between an outer surface of the finished surface 55 and the X axis shown in FIG. 5B. In example embodiments, the dimension RR is between about 0.25%-8% greater than the dimension RF, more preferably between about 0.25%-4%, for example, about 2% according to an example embodiment of the present invention. According to one example embodiment, the dimension RR is about 0.0473 inches and the dimension RF is about 0.0482 inches. Optionally, the dimensional differences between dimension RR and RF can be chosen as desired, for example, to provide for a releasable frictional engagement fit. In example embodiments, the frictional engagement provided between the ribs 56 and the implant are such that a force of between about 0.4-8 lbf is required to cause disengagement between the first and second engagement sections. Alternatively, the elements may be configured for engagement and disengagement with less or greater force.

Optionally, the one or more engagement ribs 56 may take other forms (e.g., tabs, clips, indents, detents, etc.) and be positioned as desired on one or more surfaces 54 of the male hex 52. Optionally, the engagement feature(s) can comprise a compressible, deformable, spring-biased, or otherwise resilient body or member for positively and removably engaging the implant 70. In further example embodiments, the engagement feature(s) comprise one or more snap-fit couplings. In example embodiments, the female hex of the first engagement section 82 is generally standard without any additional surface or engagement features for providing engagement with the engagement ribs 56. Alternatively, one or more surface features may be formed along one or more surfaces of the female hex of the second engagement section 82 to provide additional interengagement with the engagement ribs 56. Further optionally, the one or more engagement ribs 56 may be generally merged together to form a surface (e.g., by removing the groove 60) such that a substantially larger surface area can be provided with an interference fit with the first engagement section 82 of the female hex. In other embodiments, for example for small sizes of temporary cylinders, or in other circumstances as well, the ribs on the male irregular plug can be eliminated. Thus, optionally the male irregular hexagonal body can in another example comprise six external contact surfaces, and all of the contact surfaces can be substantially flat without ribs.

Figure 7:
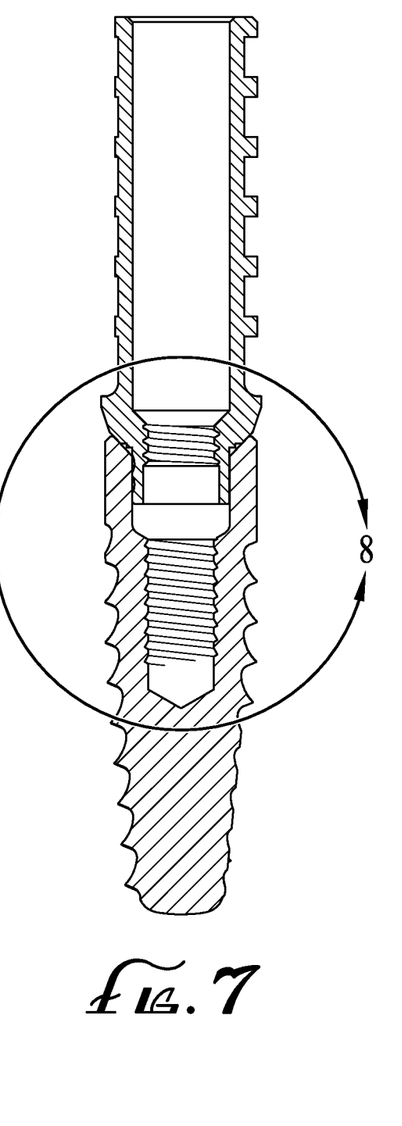
FIG. 7 is a cross-sectional view of the temporary cylinder assembled with the implant of FIG. 1 taken along line 7-7, showing a snap-in feature of the temporary cylinder removably engaging an engagement feature of the implant.
Figure 8:
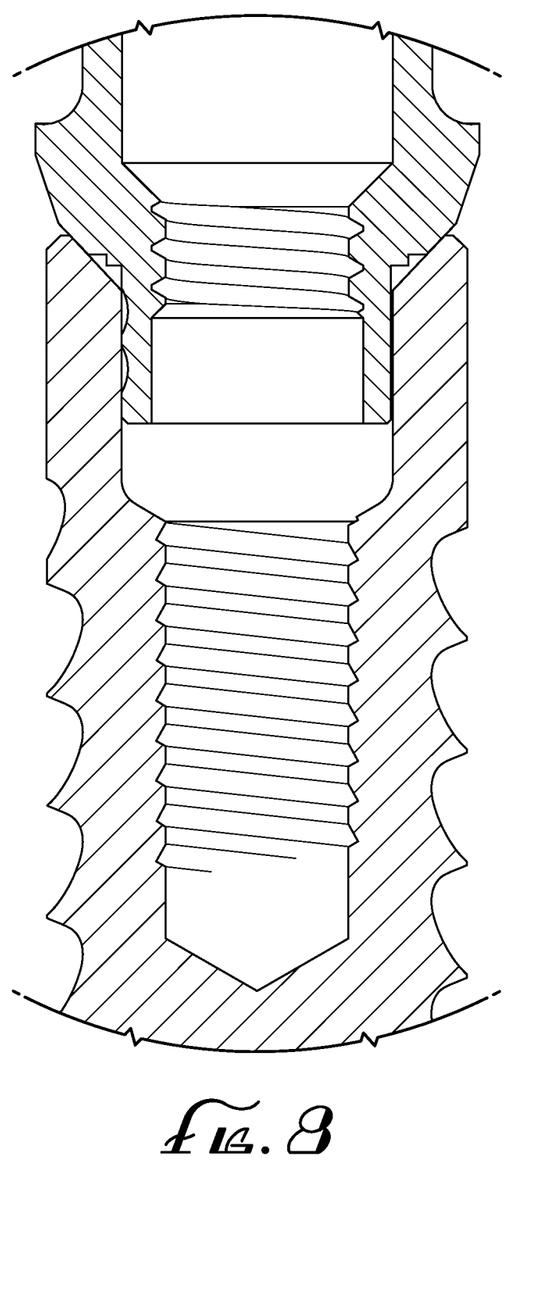
FIG. 8 is a detailed cross-sectional view of FIG. 7 showing the snap-in feature of the temporary cylinder removably engaging an engagement feature of the implant.

FIGS. 7-8 show the temporary cylinder 10 removably or releasably engaged with the implant 70, for example, wherein the male plug 52 of the second engagement section 50 is frictionally engaged (e.g., snap-in fit retention) with the first engagement section 82 of the implant 80. As shown in FIG. 8, the engagement ribs 56 are frictionally engaged with a surface of the first engagement section 82. Preferably, the temporary cylinder 10 and implant 70 are coupled to provide axial alignment along an axis 21 of the temporary cylinder 10 with the axis 71 of the implant 70. Similarly, when using an analog, the equal distribution of the engagement ribs 56 around the surfaces of the second engagement section 52 preferably provide for axial alignment of the temporary cylinder 10 with an elongate axis of the analog.

In example embodiments, a chamfered surface or bevel 45 is formed along an end portion of the engagement rib 44 to assist in fully seating with a chamfered surface 77 of the implant 70 when the temporary cylinder 10 is fitted within the first engagement section 82 of the implant 70. According to example embodiments, the mating or interface geometry defined between the bevel 45 and the chamfered surface 77 represents a beveled connection. As depicted in FIG. 8, the bevel connection is configured such that about a half of the surface area of the bevel 45 is engaged with about a half of the surface area of the chamfered surface 77. In alternate example embodiments, more or less than about half of the surface areas of the bevel and chamfered surface can be configured to engage when the temporary cylinder 10 is fully seated with the implant 70.

Alternatively, the mating or interface geometry between the temporary cylinder and the implant can be in the form of a square or butt joint (e.g., engagement of flat/parallel surfaces of the sleeve and implant without a bevel or chamfer), or can be configured otherwise such that seating verification is obtainable. For example, the engagement rib 44 and/or the second engagement section 52 can be configured and adapted for mating engagement with other known implant systems (e.g., Nobel Biocare® NobelReplace™, Straumann®, Zimmer Biomet or Zimmer dba Zimmer Dental, Biomet 31, Dentsply, Astra, Implant Direct, CAMLOG®, etc.).

The implant 70 overall is generally cylindrical in shape and extends from a first end 72 to a second end 74. The first end 72 includes a peripheral surface 76 and the second end 74 comprises threads 80. Generally, the threads 80 extend from the second end 74 to a portion of the peripheral surface 76. The first end 72 defines a generally centrally-positioned orifice that comprises an engagement body, socket or other surfaces or features forming a first engagement section 82, such as a female receiver or socket for a hexagonal driver, and an internal threaded portion 84. Preferably, the first engagement section 82 is provided for receiving and releasably engaging a receiver, plug or other surfaces or features of the second engagement section 52 of the temporary cylinder 10 (as will be described below). Optionally, one or more self-tapping flutes can be formed on the implant 20 near the second end 74.

As depicted in FIG. 7, the elongate body 12 extends along a longitudinal axis 21 and defines a length between the first and second ends 14, 16. In example embodiments, the length is between about 0.25-1.5 inches, more preferably between about 0.5-1 inches, and still more preferably between about 0.75-0.90 inches, for example, between about 0.77-0.80 inches. In example embodiments, the upper portion 40 of the temporary cylinder 10 has a length of between about 5-20 mm, more preferably between about 7-15 mm, and still more preferably about 9 mm. In example embodiments, the distance between each ridge 30 on upper portion 40 is around 1.5 mm. In example embodiments, the male plug 52 of the temporary cylinder has a diameter of between about 1-10 mm, and more preferably between 3-6 mm.

Advantageously, this permits the fitting a provisional restoration appliance to a patient's jaw according to the following method. The method includes providing a dental implant 70, the dental implant 70 comprising both female threads 84 and a female hex socket 82 and providing a temporary cylinder 10 for snap-in retention with the dental implant 70. The temporary cylinder 10 has an engagement portion 50 comprising a male irregular hexagonal plug 52. The method also includes temporarily engaging the male irregular plug 52 of the temporary cylinder 10 within the female socket 82 of the implant 70 with a detachable friction fit to temporarily secure the provisional restoration appliance to the patient's jaw. In some example embodiments, the clinician places the second engagement section (e.g., male hex) of the temporary cylinder within the first engagement section (e.g., female hex) of the implant by grasping the temporary cylinder with their fingers or with a tool and firmly seating the first and second engagement sections together. Depending on the tolerance of the fit and/or the interference caused by the engagement ribs of the second engagement section, more or less force may be required to fully seat the second engagement section with the first engagement section. In example embodiments, a light to moderate hand pressure is sufficient.

The method includes observing the fit of the provisional restoration appliance and removing the provisional restoration appliance and making adjustments as needed. The clinician then removes the temporary cylinder 10 from the implant, for example by grasping the upper section 40 of the elongate body 12 and pulling to overcome the frictional or snap-fit engagement between the at least one engagement rib 56 of the second engagement section 52 with the first engagement section. Optionally, a dental probe or other tool may be utilized to assist in removing the temporary cylinder 10 from the implant 70, for example, wherein the tool is inserted into or through the cylindrical channel 42. As described above, in example embodiments, the frictional engagement provided between the ribs 56 and the implant 70 (e.g., first and second engagement sections) is such that a force of between about 0.40-8.01 lbf may be applied to engage and disengage the first and second engagement sections. Alternatively, the components may be configured for a greater or lesser engagement and/or disengagement force. Adjustments include cutting the upper portion of the temporary cylinder to reduce its height. The clinician can used the spaced ridges along the upper portion of the temporary cylinder as a guide for cutting the upper portion. Once the fit is satisfactory, installing the provisional restoration appliance and securing it to the patient's jaw using screws screwed through the temporary cylinder 10 and into the dental implant 70.

According to another example aspect, the present invention relates to a method of fastening a temporary cylinder to an implant. The method comprises providing an implant, the implant comprising a first engagement section; providing a temporary cylinder, the temporary cylinder comprising a second engagement section, the second engagement section being generally complementary in shape to the first engagement section; providing at least one rib or other engagement feature or surface on at least a portion of the second engagement section; installing the implant in the mandible or maxilla of a human or animal patient; and engaging the second engagement feature of the temporary cylinder with the first engagement feature of the implant such that the second engagement feature positively and releasably engages at least a portion of the first engagement feature. The method then optionally further comprises removing the temporary cylinder from the implant.

Thus, according to example embodiments of the present invention, the temporary cylinder can be placed and removed from the implant without the need for fasteners such as abutment screws. Placement and removal of the temporary cylinder without requiring fasteners saves a substantial amount of time for the clinician, thereby substantially reducing the amount of time a patient must remain in the dental chair. Furthermore, the temporary cylinder 10 of the present invention preferably allows for easier placement in the posterior of a patient's mouth where vertical space is often limited. Without the need for a driver or other tool for fastening the abutment screw to the implant, the temporary cylinder may be sized to be at least slightly taller than screw-attached scan bodies, with a greater surface area available for more precise scanning alignment, and better clearance around neighboring dentition. Additionally, without the need for a fastener, risk of patient aspiration of the fastener is eliminated. Furthermore, the temporary cylinder of the present invention is optionally reusable, which offers a cost savings to the practitioner and/or the patient.

While the invention has been described with reference to example embodiments, it will be understood by those skilled in the art that a variety of modifications, additions and deletions are within the scope of the invention, as defined by the following claims.

What is claimed is:

1. A provisional restoration appliance for attachment to a patient's jaw comprising:
   a dental implant adapted to be screwed directly into a patient's bone and comprising a first engagement section;
   a temporary cylinder for snap-in retention with the dental implant, the temporary cylinder comprising:
   an elongate body extending from a first end to a second end along an axis of elongation, the elongate body being generally cylindrical and comprising:
   an upper portion;
   a lower engagement portion positioned adjacent the upper portion; and
   wherein the temporary cylinder's lower engagement portion comprises a male irregular hexagonal plug, wherein the implant's first engagement section comprises a female regular hexagonal socket, and wherein the male irregular hexagonal plug and the female regular hexagonal socket are configured for inter-engagement with each other, and wherein the fitment of the irregular hexagonal plug and regular hexagonal socket together with one another results in a frictional fit when inter-engaged, and
   wherein the elongate body has a longitudinal screw hole formed therein whereby the temporary cylinder at times can be attached and secured to the implant with the aid of a screw threaded into the implant through the screw hole in the temporary cylinder and at other times the temporary cylinder can be held in place by friction without the use of a screw, and wherein with the dental implant secured within the bone structure of the patient's jaw, the temporary cylinder can be releasably engaged by a frictional fit or snap coupling directly with the dental implant.

2. The provisional restoration appliance of claim 1, wherein the male irregular hexagonal plug includes at least some contact surfaces having a first dimension and some other contact surfaces of a second dimension, the second dimension being different than the first dimension.

3. The provisional restoration appliance of claim 1, wherein the male irregular hexagonal body comprises six external contact surfaces, and wherein some of the contact surfaces are substantially flats and some are ribbed.

4. The provisional restoration appliance of claim 3, wherein at least three of the six external contact surfaces are ribbed.

5. The provisional restoration appliance of claim 3, wherein the contact surfaces comprising alternating flat contact surfaces and ribbed contact surfaces are equally distributed around the male irregular hexagonal body.

6. The provisional restoration appliance of claim 1, wherein the male irregular hexagonal body comprises six external contact surfaces, and wherein all of the contact surfaces are substantially flats.

7. The provisional restoration appliance of claim 1, further comprising at least one engagement rib adjacent the lower engagement portion and wherein insertion depth of the male irregular hexagonal plug into the female regular hexagonal socket is limited by the at least one engagement rib.

8. The provisional restoration appliance of claim 1, wherein the elongate body comprises a polymer.

9. The provisional restoration appliance of claim 8, wherein the polymer comprises polyether ether ketone.

10. The provisional restoration appliance The temporary cylinder of claim 1 wherein the upper portion comprises a series of spaced apart ridges each having flats formed on the periphery of the ridges.

11. A provisional restoration appliance for attachment to a patient's jaw comprising:
 a dental implant adapted to be screwed directly into a patient's bone and comprising a first engagement section;
 a temporary cylinder for snap-in retention with the dental implant, the temporary cylinder comprising:
 an elongate body extending from a first end to a second end, the elongate body being generally cylindrical and comprising:
 an upper portion;
 a lower engagement portion positioned adjacent the upper portion; and
 wherein the temporary cylinder's lower engagement portion comprises a male irregular hexagonal plug, wherein the implant's first engagement section comprises a female regular hexagonal socket, and wherein the male irregular hexagonal plug and the female regular hexagonal socket are configured for inter-engagement with each other, and wherein the fitment of the irregular hexagonal plug and regular hexagonal socket together with one another results in a frictional fit when inter-engaged, and wherein with the dental implant secured within the bone structure of the patient's jaw, the temporary cylinder can be releasably engaged by a frictional fit or snap coupling directly with the dental implant.

12. The provisional restoration appliance of claim 11, wherein the male irregular hexagonal plug includes at least some contact surfaces having a first dimension and some other contact surfaces of a second dimension, the second dimension being different than the first dimension.

13. The provisional restoration appliance of claim 11, wherein the male irregular hexagonal body comprises six external contact surfaces, and wherein some of the contact surfaces are substantially flats and some are ribbed.

14. The provisional restoration appliance of claim 13, wherein at least three of the six external contact surfaces are ribbed.

15. The temporary cylinder of claim 13, wherein the contact surfaces comprising alternating flat contact surfaces and ribbed contact surfaces are equally distributed around the male irregular hexagonal body.

16. The provisional restoration appliance of claim 11, wherein the male irregular hexagonal body comprises six external contact surfaces, and wherein all of the contact surfaces are substantially flats.

17. The provisional restoration appliance of claim 11, further comprising at least one engagement rib adjacent the lower engagement portion and wherein insertion depth of the male irregular hexagonal plug into the female regular hexagonal socket is limited by the at least one engagement rib.

18. The provisional restoration appliance of claim 11, wherein the elongate body comprises polyether ether ketone.

19. The provisional restoration appliance of claim 11, wherein the elongate body has a longitudinal screw hole formed therein whereby the temporary cylinder can be at times attached and secured to the implant with the aid of a screw threaded into the implant through the screw hole in the temporary cylinder and at other times the temporary cylinder is held in place by friction without the use of a screw.

20. The provisional restoration appliance of claim 11, wherein the upper portion comprises ridges each having multiple flats formed on the periphery of the ridges.

21. A method of fitting a provisional restoration appliance to a patient's jaw comprising the steps of:
 providing a dental implant, the dental implant comprising both female threads and a female regular hex socket;
 providing a temporary cylinder for snap-in retention with the dental implant
 wherein the temporary cylinder's has an engagement portion comprising a male irregular hexagonal plug;
 temporarily engaging the male irregular plug of the temporary cylinder within the regular female socket of the implant with a detachable friction fit to temporarily secure the provisional restoration appliance to the patient's jaw;
 observing the fit of the provisional restoration appliance; and
 removing the provisional restoration appliance and making adjustments as needed, and, once the fit is satisfactory, installing the provisional restoration appliance and securing it to the patient's jaw using screws screwed through the temporary cylinder and into the dental implant.

\* \* \* \* \*